United States Patent [19]
Rink et al.

[11] Patent Number: 5,840,372
[45] Date of Patent: Nov. 24, 1998

[54] PROCESS FOR THE PRODUCTION OF A MULTILAYER PROTECTIVE AND/OR DECORATIVE COATING ON A SUBSTRATE SURFACE, AND AQUEOUS PAINTS SUITABLE FOR CARRYING OUT THE PROCESS

[75] Inventors: Heinz Peter Rink; Bernhard Lettmann, both of Münster, Germany; Achim Gast, Yuigahama, Japan

[73] Assignee: BASF Lacke+Farben, AG, Muenster-Hiltrup, Germany

[21] Appl. No.: 325,470

[22] PCT Filed: Apr. 21, 1993

[86] PCT No.: PCT/EP93/00967

§ 371 Date: Dec. 9, 1994

§ 102(e) Date: Dec. 9, 1994

[87] PCT Pub. No.: WO93/23443

PCT Pub. Date: Nov. 25, 1993

[30] Foreign Application Priority Data

May 12, 1992 [DE] Germany ............... 42 15 499.5

[51] Int. Cl.⁶ .................................................. B05D 1/36

[52] U.S. Cl. .................. 427/407.1; 427/409; 524/437; 524/441; 524/507; 524/512; 524/513; 524/549; 524/811

[58] Field of Search ............... 524/549, 811, 524/507, 512, 513, 437, 441; 427/407.1, 409

[56] References Cited

U.S. PATENT DOCUMENTS 4,497,929  2/1985  Brown et al. .................. 524/549 X
4,663,411  5/1987  Reeb et al. .................... 524/549 X

FOREIGN PATENT DOCUMENTS 0 357 110 A1  7/1989  European Pat. Off. ...... C09D 151/00

*Primary Examiner*—Judy M. Reddick

[57] ABSTRACT

The invention relates to a process for the production of two-coat finishes, in which a pigmented aqueous basecoat is applied, the basecoat obtained is coated over with a clearcoat, and basecoat and clearcoat are baked together. The process according to the invention is distinguished in that the aqueous basecoat contains a polyacrylate resin which has been prepared using furfuryl acrylate and/or furfuryl methacrylate.

7 Claims, No Drawings

PROCESS FOR THE PRODUCTION OF A MULTILAYER PROTECTIVE AND/OR DECORATIVE COATING ON A SUBSTRATE SURFACE, AND AQUEOUS PAINTS SUITABLE FOR CARRYING OUT THE PROCESS

The invention relates to a process for the production of a multilayer protective and/or decorative coating on a substrate surface, in which (1) a pigmented aqueous basecoat which contains a polyacrylate resin as binder is applied to the substrate surface, the polyacrylate resin being obtainable by polymerization of (a) a mixture of esters of methacrylic acid and/or esters of acrylic acid, together if required with (b) further monomers different from (a) or mixtures of such monomers, (2) a polymer film is formed from the basecoat applied in stage (1), (3) a transparent topcoat is applied to the resulting basecoat and subsequently (4) basecoat and topcoat are baked together.

The invention also relates to aqueous paints suitable for carrying out the process described above.

The above-described process for the production of multilayer protective and/or decorative coatings is known as the basecoat/clearcoat process and is employed in particular in the production of finishes, in particular metallic finishes, on car bodies (cf. e.g. DE-A-38 41 540, EP-A-287 144, DE-A-36 28 124, EP-A-195 931 and EP-A-256 540).

The extent of the metallic effect in the multilayer coatings produced by the process under discussion depends on how many of the metallic pigment particles present in flake form and contained in the basecoat are present in the baked finish in parallel orientation to the substrate surface. The orientation of the metallic pigment particles can be disturbed in particular after the application of the transparent topcoat and/or during the baking procedure.

The object on which the present invention is based consists in the provision of a process of the type described above with which multilayer coatings can be obtained having an improved metallic effect in comparison to multilayer coatings of the prior art. This object is surprisingly achieved in that, in the pigmented basecoat, a polyacrylate resin is employed which can be obtained by employing as component (a) a mixture of esters of methacrylic acid and/or esters of acrylic acid which contains furfuryl acrylate and/or furfuryl methacrylate.

The polyacrylate resins employed in accordance with the invention can be prepared by polymerization of (a) a mixture of esters of methacrylic acid and/or esters of acrylic acid, together if appropriate with (b) further monomers different from (a) or mixtures of such monomers. It is essential to the invention to employ as component (a) a mixture of esters of methacrylic acid and/or esters of acrylic acid, which contains furfuryl acrylate and/or furfuryl methacrylate, preferably furfuryl methacrylate. It is preferred for component (a) to contain a quantity of furfuryl acrylate and/or furfuryl methacrylate such that the proportion of furfuryl acrylate and/or furfuryl methacrylate, based on the total weight of (a)+(b)=100% by weight, is 0.25 to 10% by weight, preferably 1.0 to 9.0% by weight and particularly preferably 2.0 to 7.0% by weight. The polymerization of components (a) and (b) can be carried out in an organic solvent or in a mixture of organic solvents. The solution of the polyacrylate resin obtained in this way can then be converted to an aqueous dispersion by adding water. The polyacrylate resins employed in accordance with the invention can also be prepared by polymerization of components (a) and (b) in an aqueous emulsion. Both the polymerization in organic solvents and the polymerization in aqueous emulsion are in general carried out by free-radical methods. The above-described polymerization processes are so well known that they require no further description here.

In order to obtain water-dilutable polyacrylate resins, components (a) and/or (b) must comprise monomers containing hydrophilic groups, for example carboxyl groups, sulfonic acid groups or hydrophilic polyether chains, for example $-(CH_2-CH_2-O)_nH$, $-(-CHCH_3-CH_2-O)_nH$ or $-(CH_2-CH_2-O)_x(CHCH_3-CH_2-O)_yH$, in which n is a number from 4 to 20, x is a number from 1 to 19 and y is a number from 1 to 19. Polyacrylate resins containing carboxyl groups are in general neutralized, at least in part. As neutralizing agents it is preferred to employ tertiary amines. If the polyacrylate resins employed in accordance with the invention contain carboxyl groups, then they should have an acid value of 1 to 80, preferably 5 to 50 mg of KOH per g of solid resin.

Component (a) can contain, in addition to the furfuryl acrylate and/or furfuryl methacrylate employed in accordance with the invention, further esters of methacrylic acid or acrylic acid, for example aliphatic and cycloaliphatic acrylates or methacrylates having up to 20 carbon atoms in the alcohol residue, such as methyl, ethyl, propyl, butyl, hexyl, ethylhexyl, stearyl, lauryl and cyclohexyl acrylate or methacrylate and hydroxyalkyl esters of acrylic acid or methacrylic acid, such as 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate etc.

Component (b) comprises monomers which are different from the monomers contained in component (a), or mixtures of such monomers. Examples of monomers from which component (b) can be comprised are: acrylic acid, methacrylic acid, styrene, a-alkylstyrene, vinyltoluene, acrylamide, methacrylamide, N-methylolacrylamide, N-methylolmethacrylamide, acrylonitrile, methacrylonitrile, ethacrylic acid and esters of ethacrylic acid, crotonic acid and esters of crotonic acid, acrylamidomethylpropanesulfonic acid, maleic acid and esters of maleic acid, fumaric acid and esters of fumaric acid, and itaconic acid and esters of itaconic acid. It is preferred not to employ acrylamide and/or methacrylamide in component (b).

The polyacrylate resins employed in accordance with the invention preferably contain hydroxyl groups, and preferably have hydroxyl values of between 2 and 100, particularly preferably between 10 and 60.

The number-average molecular weight (determined by gel permeation chromatography using a polystyrene standard) of the polyacrylate resins employed in accordance with the invention is in general between 1500 and 2,000,000, preferably between 200,000 and 2,000,000, particularly preferably between 300,000 and 1,500,000.

It is preferred to employ polyacrylate resins which have been prepared by emulsion polymerization. It is very particularly preferred to employ polyacrylate resins which can be prepared by a two-stage emulsion polymerization in which (α) in a first stage, 10 to 90% by weight, preferably 35 to 65% by weight, of the total amount of component (a) to be employed, together if appropriate with 0 to 100% by weight of the total amount of component (b) to be employed, are polymerized in the aqueous phase in the presence of one or more emulsifiers and of one or more free-radical initiators, the monomers employed in the first stage being chosen such that in the first stage a polymer with a glass transition temperature ($T_{G1}$) of +30° to +110° C., preferably +60° to +95° C., is obtained, and (β) after at least 60% by weight of the monomers employed in the first stage have reacted, in a second stage 90 to 10% by weight, preferably 65 to 35% by weight, of the total amount of component (a) to be employed, together if appropriate with 0 to 100% by weight of the total amount of component (b) to be employed are polymerized in the presence of the polymer obtained in the first stage; the monomers employed in the second stage are chosen such that the polymerization only of the monomers employed in the second stage would lead to a polymer having a glass transition temperature ($T_{G2}$) of −60° to +20° C., preferably −50° to 0° C., the reaction conditions are chosen such that the polyacrylate resin obtained has a number-average molecular weight of 200,000 to 2,000,000, preferably 300,000 to 1,500,000 and the monomers employed in the first and in the second stage are selected such that the polyacrylate resin obtained has a hydroxyl number of 0 to 100, preferably 10 to 60 and the difference $T_{G1}-T_{G2}$ is 10° to 170° C.

In order to prepare the polyacrylate resins which are preferably employed and which can be prepared by the two-stage emulsion polymerization described above, component (a) is divided into two parts. 10 to 90% by weight of the total amount of component (a) to be employed are employed in the first stage and 90 to 10% by weight of the total amount of component (a) to be employed are employed in the second stage. If component (b) is also employed in the preparation of the polyacrylate resin, then component (b) can be employed in the first stage, in the second stage or both in the first and in the second stage. The furfuryl acrylate and/or furfuryl methacrylate to be employed in accordance with the invention can be employed in the first stage, in the second stage or both in the first and in the second stage. It is preferably employed in the second stage. In the preparation of the polyacrylate resins which are preferably employed and which can be prepared by the emulsion polymerization described above, the monomers employed in the first stage must be chosen, with regard to their nature and amount, such that in the first stage a polymer having a glass transition temperature ($T_{G1}$) of +30° to +110° C., preferably +60° to +95° C., is obtained; the monomers employed in the second stage must be chosen, with regard to their nature and amount, such that the polymerization of only the monomers employed in the second stage would lead to a polymer having a glass transition temperature ($T_{G2}$) of −60° to +20° C., preferably −50° to 0° C., and the monomers employed in the first and second stage must be chosen, with regard to their nature and amount, such that the condition $T_{G1}-T_{G2}=$ 10° to 170° C., preferably 80° to 150° C., is met.

The selection of the monomers to be employed in the two stages can easily be made by the person skilled in the art since the glass transition temperature of polyacrylate resins can be calculated approximately by the equation $$\frac{1}{T_G} = \sum_{n=1}^{n=y} \frac{W_n}{T_{Gn}}$$

where $T_G$=glass transition temperature of the copolymer in K
$W_n$=weight fraction of the nth monomer
$T_{Gn}$=glass transition temperature of the homopolymer of the nth monomer
x=number of different monomers
and because the hydroxyl value of the polyacrylate resins can be controlled by the amount of hydroxyl group-containing monomers employed.

The person skilled in the art is familiar with how to choose the reaction conditions during the emulsion polymerization so that polyacrylate resins which have the number-average molecular weights indicated above are obtained (cf. e.g. Chemie, Physik und Technologie der Kunststoffe in Einzeldarstellungen, Dispersionen synthetischer Hochpolymerer, Part 1 by F. Hölscher, Springer Verlag, Berlin, Heidelberg, N.Y., 1969).

It is preferred in the first stage to employ no monomers containing hydroxyl and/or carboxyl groups.

The preparation of polyacrylate resins by two-stage emulsion polymerization is described in detail in DE-A-38 41 540 on page 2, line 38 to page 5, line 7 and on page 8, line 35 to page 10, line 2.

The basecoats can also contain, in addition to the polyacrylate resins described above, other binder constituents, such as water-dilutable polyester resins, water-dilutable polyacrylate resins not prepared using furfuryl acrylate and/or furfuryl methacrylate, water-dilutable polyurethane resins, water-dilutable polyethers etc. and crosslinking agents such as amino resins, especially melamine resins and blocked polyisocyanates. Examples of these binder constituents and crosslinking agents are described in, for example, DE-A-38 41 540, EP-A-287 144, EP-A-38 127, DE-A-36 28 124, EP-A-195 931 and EP-A-256 540.

As pigments, the basecoats employed in accordance with the invention can contain all inorganic or organic pigments suitable for aqueous paints, or mixtures of such inorganic and/or organic pigments. Examples of pigments which can be employed are titanium dioxide, iron oxide, carbon black, metallic pigments, especially aluminum pigments, and pearlescent and interference pigments. The basecoats preferably contain metallic pigments, in particular aluminum pigments on their own or in combination with nonmetallic pigments.

The basecoats employed in accordance with the invention may in principle be coated over with all transparent topcoats (clearcoats) suitable for the basecoat/clearcoat process. The transparent topcoats may be conventional finishes—that is, containing exclusively organic solvents—or aqueous finishes, or powder coatings.

The invention is illustrated in more detail in the following examples. All data on parts and percentages are by weight, unless expressly stated otherwise.

A) Preparation of an aqueous dispersion of a polyacrylate resin in accordance with DE-A-38 41 540 (cf. DE-A-38 41 540, page 8, emulsion Polymer dispersion 1)

1344 g of deionized water and 12 g of a 30% strength aqueous solution of the ammonium salt of penta(ethylene glycol) nonylphenyl ether-sulfate (Fenopon® EP 110 from GAF Corp., emulsifier 1) are placed in a cylindrical jacketed glass vessel with a stirrer, reflux condenser, stirrable feed vessel, dropping funnel and thermometer and heated to 82° C. In the stirrable feed vessel an emulsion is prepared from 720 g of deionized water, 24 g of emulsifier 1, 10.8 g of acrylamide, 864 g of methyl methacrylate and 216 g of n-butyl methacrylate. 30% by weight of this emulsion are added to the initial charge. Then 28% by weight of a solution of 3.1 g of ammonium peroxodisulfate (APS) in 188 g of deionized water are added dropwise over 5 minutes. An exothermic reaction commences. The reaction temperature is maintained at between 82° and 88° C. 15 minutes after the end of the addition of the ammonium peroxodisulfate solution the remaining 70% by weight of the emulsion together with the remaining 72% by weight of the ammonium peroxodisulfate solution are added over one hour, the temperature being maintained at 85° C. The batch is then cooled to 82° C. and, over 2 hours, a mixture of 842 g of n-butyl acrylate, 108 g of hydroxypropyl methacrylate, 43 g of methyl methacrylate, 43.2 g of methacrylic acid, 32.4 g of acrylamide and 5.4 g of eicosa(ethylene glycol) nonylphenyl ether (Antoroxs CO 850 from GAF Corp., emulsifier 2) together with 343 g of deionized water is added. After the end of the additions the reaction mixture is held at 85° C. for a further 1.5 hours. It is then cooled and the dispersion is poured onto a fabric with a mesh size of 30 μm. The finely particulate dispersion obtained has a nonvolatile content of 45% by weight, a pH of 3.4, an acid number of 13 and an OH number of 20.

B) Preparation of an aqueous dispersion of a polyacrylate resin using furfuryl methacrylate 1344 g of deionized water and 12 g of a 30% strength aqueous solution of the ammonium salt of penta(ethylene glycol) nonylphenyl ether-sulfate (Fenopon® EP 110 from GAF Corp., emulsifier 1) are placed in a cylindrical jacketed glass vessel with a stirrer, reflux condenser, stirrable feed vessel, dropping funnel and thermometer and heated to 82° C. In the stirrable feed vessel an emulsion is prepared from 720 g of deionized water, 24 g of emulsifier 1, 10.8 g of acryl amide, 864 g of methyl methacrylate and 216 g of n-butyl methacrylate. 30% by weight of this emulsion are added to the initial charge. Then 28% by weight of a solution of 3.1 g of ammonium peroxodisulfate (APS) in 188 g of deionized water are added dropwise over 5 minutes. An exothermic reaction commences. The reaction temperature is held at between 82° and 88° C. 15 minutes after the end of the addition of the ammonium peroxodisulfate solution the remaining 70% by weight of the emulsion together with the remaining 72% by weight of the ammonium peroxodisulfate solution are added over one hour, the temperature being maintained at 85° C. The batch is then cooled to 82° C. and, over 2 hours, a mixture of 792 g of n-butyl acrylate, 108 g of hydroxypropyl methacrylate, 43 g of methyl methacrylate, 43.2 g of methacrylic acid, 32.4 g of acrylamide, 50 g of furfuryl-methacrylate and 5.4 g of eicosa(ethylene glycol) nonylphenyl ether (Antarox® CO 850 from GAF Corp., emulsifier 2) together with 343 g of deionized water is added. After the end of the additions the reaction mixture is held at 85° C. for a further 1.5 hours. It is then cooled and the dispersion is poured onto a fabric with a mesh size of 30 pm. The finely particulate dispersion obtained has a nonvolatile content of 45% by weight, a pH of 3.4, an acid number of 13 and an OH number of 20. This polyacrylate resin differs from the polyacrylate resin described in A) only in that in the second stage, instead of 842 g of n-butyl acrylate, a mixture of 792 g of n-butyl acrylate and 50 g of furfuryl methacrylate (FMA, Röhm GmbH, CAS 3454-28-2) is employed.

C) Preparation of an aqueous basecoat using the polvacrylate resin as in A)

16.4 g of butylglycol, 3.4 g of a commercially available melamine/formaldehyde resin (Cymel® 301), 2.9 g of polypropylene glycol (number-average molecular weight 420) and 6.6 g of an aluminum bronze in accordance with DE-A-36 36 183 (aluminum content: 65% by weight) are stirred using a high-speed stirrer for 15 minutes (300–500 rpm). A mixture 1 is obtained.

33.5 g of the polyacrylate resin dispersion prepared according to A) are mixed with 20.3 g of deionized water and adjusted with a 5% strength aqueous dimethylethanolamine solution to a pH of 7.7. The mixture is stirred for 10 minutes, then 17.0 g of a 3.5% strength solution of a commercially available polyacrylic acid thickener (Viscalex® HV/30 from Allied Colloids, pH: 8.0) are added, and the mixture is stirred for a further 10 minutes. The mixture 2 is obtained.

Mixtures 1 and 2 are mixed for 30 minutes at 800–1000 rpm. The resulting basecoat is adjusted with a 5% strength aqueous dimethylethanolamine solution to a pH of 7.7 and with deionized water to a solids content of 20% by weight.

D) Preparation of a basecoat according to the invention

The procedure of C) is followed. Instead of the polyacrylate resin dispersion prepared according to A), the polyacrylate dispersion prepared according to B) is employed.

E) Preparation of multilayer finishes The basecoats prepared according to C) and D) are sprayed by a known method onto phosphatized steel panels (Bonder 132) coated with a commercially available electrodeposition coating and a commercially available filler, coated over after a flashoff time of 10 minutes at 80° C. with a commercially available clearcoat and baked for 20 minutes at 140° C. A reference value of 65 is determined for the metallic effect of the multilayer finish produced with the basecoat prepared according to C) and, for the metallic effect of the multilayer finish produced with the basecoat prepared according to D), a reference value of 78. Using the basecoat according to the invention it is therefore possible to produce multilayer finishes having a metallic effect which is improved compared to the prior art.

The reference values for the metallic effect are determined as follows:

1. Measurement of the spectral reflection using a Datacolor/Zeiss MCS 211/MMK 111 goniospectrophotometer under the following geometrical conditions

| Geometry class | Illumination | Observation |
| --- | --- | --- |
| 25° | 45° | −20° |
| 70° | 45° | 25° |

2. Determination of the CIEL*a*b* 1976 color coordinates according to DIN 5033 and DIN 6174 for a 100 standard observer under standard lighting $D_{65}$.

3. Determination of the reference value for the metallic effect according to the relationship:

reference value=$((L_{25°}-L_{70°})\ 50) : L_{70°}$.

We claim:

1. Process for the preparation of a multilayer coating on a substrate surface, comprising
    (1) applying a pigmented aqueous basecoat which comprises a polyacrylate resin and a crosslinking agent selected from the group consisting of aminoplasts and blocked polyisocyanates, as binder to the substrate surface, wherein the polyacrylate resin is obtained by polymerization of
        (a) a mixture of esters comprising
            i) esters selected from the group consisting of furfuryl acrylate, furfuryl methacrylate, and mixtures thereof and
            ii) esters selected from the group consisting of esters of methacrylic acid, esters of acrylic acid, and mixtures thereof, and
        (b) monomers different from a) and mixtures thereof, such that the proportion of furfuryl acrylate and/or furfuryl methacrylate, based on the total weight of (a)+(b)=100% by weight, is 0.25 to 10% by weight, (2) forming a polymer film from the basecoat applied in stage (1), (3) applying a transparent topcoat to the resulting basecoat and subsequently (4) baking together the basecoat and topcoat.

2. Process according to claim 1, characterized in that component (a) contains furfuryl methacrylate.

3. Process according to claim 1, characterized in that the pigmented aqueous basecoat contains a pearlescent pigment.

4. Aqueous paints comprising a polyacrylate resin and a crosslinking agent selected from the group consisting of aminoplasts and blocked polyisocyanates as binder, wherein the polyacrylate resin is obtained by polymerization of (a) a mixture of esters comprising
  i) esters selected from the group consisting of furfuryl acrylate, furfuryl methacrylate and mixtures thereof, and
  ii) esters selected from the group consisting of esters of methacrylic acid, esters of acrylic acid and mixtures thereof, and b) monomers different from (a), such that the proportion of furfuryl acrylate and/or furfuryl methacrylate, based on the total weight of (a)+(b)=100% by weight, is 0.25 to 10% by weight, characterized in that they contain a pigment selected from the group consisting of metallic pigment pearlescent pigment, and mixtures thereof.

5. Aqueous paints according to claim 4, characterized in that component (a) contains furfuryl methacrylate.

6. Process according to claim 1, characterized in that the pigmented aqueous basecoat contains an aluminum pigment.

7. Process for improving the metallic effect of a multilayer coating on a substrate surface, comprising (1) applying a pigmented aqueous basecoat which comprises a polyacrylate resin, a crosslinking agent selected from the group consisting of aminoplasts and blocked polylsocyanates, and metallic pigment, as binder to the substrate surface, wherein the polyacrylate resin is obtained by polymerization of (a) a mixture of esters comprising
  i) esters selected from the group consisting of furfuryl acrylate, furfuryl methacrylate, and mixtures thereof and
  ii) esters selected from the group consisting of esters of methacrylic acid, esters of acrylic acid, and mixtures thereof, optionally, (b) monomers different from a) and mixtures thereof, such that the proportion of furfuryl acrylate and/or furfuryl methacrylate, based on the total weight of (a)+(b)=100% by weight, is 0.25 to 10% by weight, (2) forming a polymer film from the basecoat applied in stage (1), (3) applying a transparent topcoat to the resulting basecoat and subsequently (4) baking together the basecoat and topcoat.

* * * * *